Figure 1:
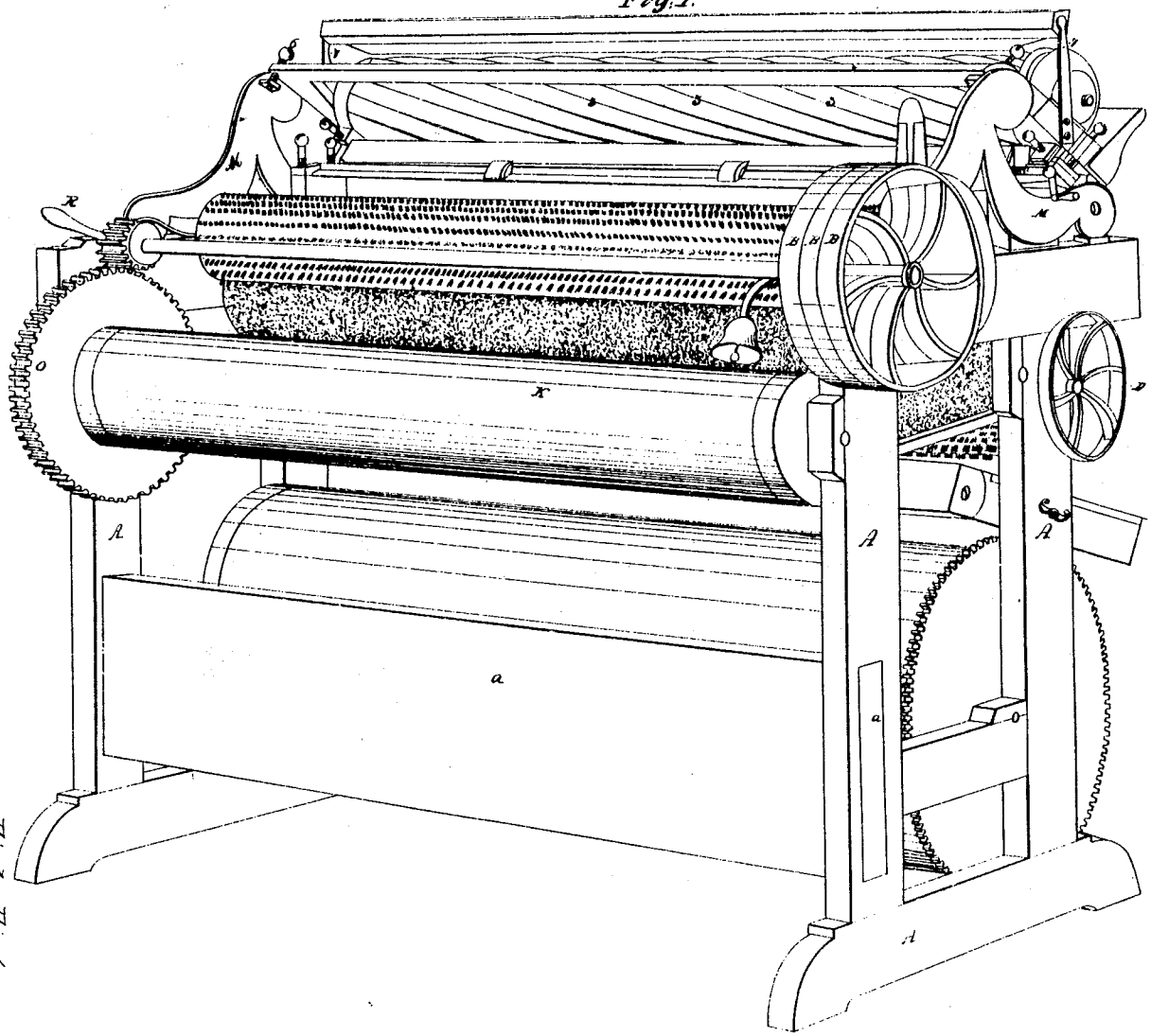
Figure 2:
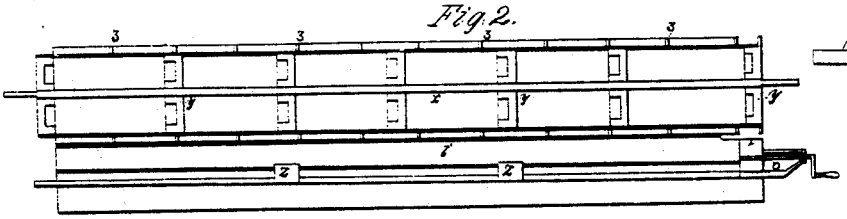
Figure 3:
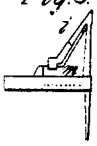
Figure 4:
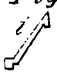

R. Daniels.
Shearing Mach.

BEST AVAILABLE COPY

§379 X

Reissued Aug. 22, 1834.

N. PETERS, PHOTO-LITHOGRAPHER, WASHINGTON, D. C.

Sheet 2. 3 Sheets.
8379 X
R. Daniels.
Shearing Mach.
BEST AVAILABLE COPY
Reissued Aug. 22, 1834.
No 1
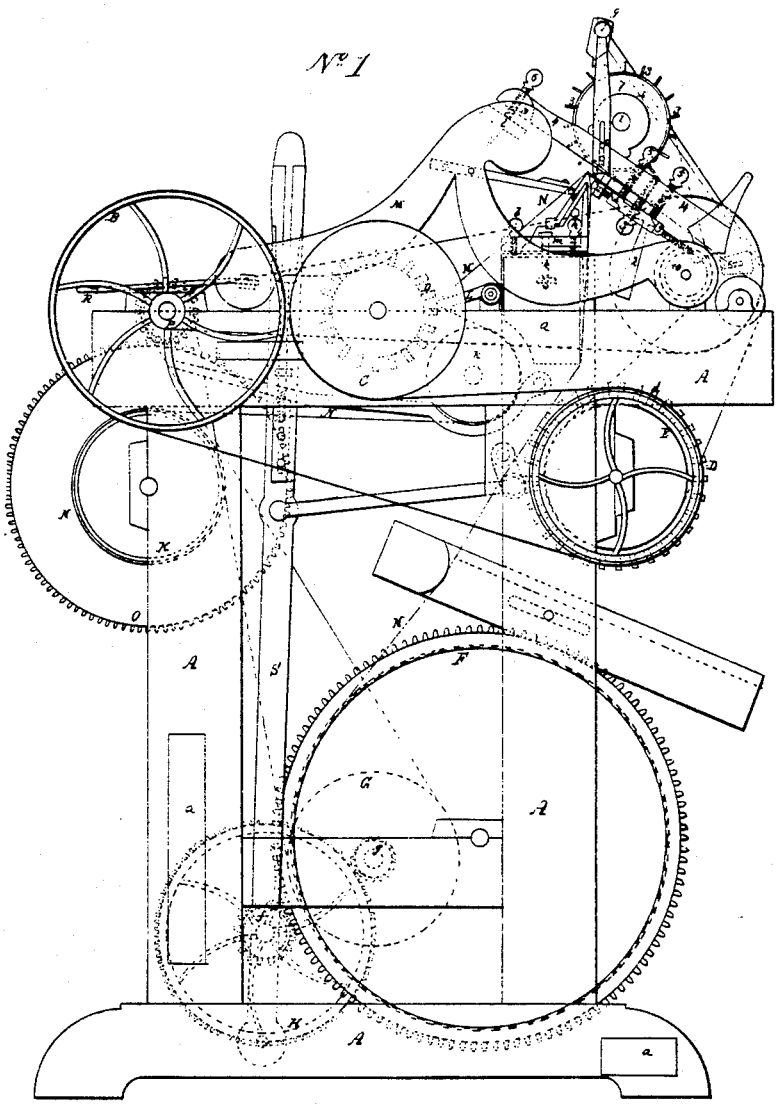
H. PETERS, PHOTO-LITHOGRAPHER, WASHINGTON, D. C.

R. Daniels.
Shearing Mach.
Sheet 3. 3 Sheets.
BEST AVAILABLE COPY
8374
Reissued Aug. 22, 1834.
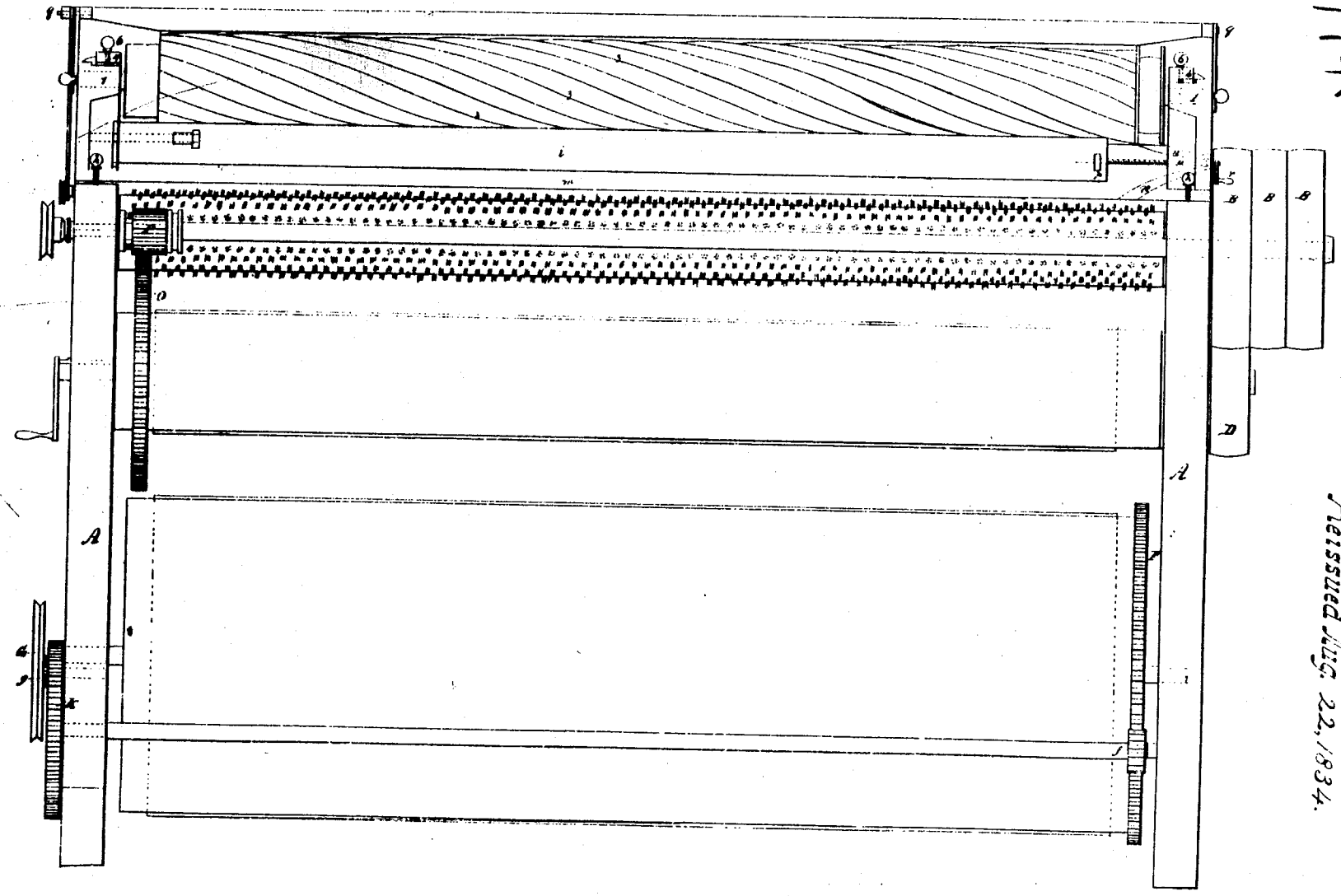
No. 5
N. PETERS, PHOTO-LITHOGRAPHER, WASHINGTON, D. C.

United States Patent Office

PTO - BOYERS, PA Duty Station

MISSING PAGE TEMPORARY NOTICE

PATENT # RX 8379 FOR ISSUE DATE 8-22-1834

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Page 4 to end

Data Conversion Operation

Boyers, Pa